United States Patent
Pratt et al.

(10) Patent No.: US 7,254,330 B2
(45) Date of Patent: Aug. 7, 2007

(54) SINGLE FIBER PASSIVE OPTICAL NETWORK WAVELENGTH DIVISION MULTIPLEX OVERLAY

(75) Inventors: Michael K. Pratt, Plano, TX (US); George H. BuAbbud, Southlake, TX (US); Debra Wawro, Arlington, TX (US); Muneer Zuhdi, Lewisville, TX (US)

(73) Assignee: Tellabs Bedford, Inc., Bedford, TX (US)

( * ) Notice: Subject to any disclaimer, the term of this patent is extended or adjusted under 35 U.S.C. 154(b) by 789 days.

(21) Appl. No.: 10/199,566

(22) Filed: Jul. 19, 2002

(65) Prior Publication Data
US 2003/0076560 A1 Apr. 24, 2003

Related U.S. Application Data

(60) Provisional application No. 60/306,907, filed on Jul. 20, 2001.

(51) Int. Cl.
*H04J 14/00* (2006.01)
*H04J 4/00* (2006.01)

(52) U.S. Cl. .............................. 398/67; 398/72; 398/76
(58) Field of Classification Search .................. 398/63, 398/66–67, 72, 76
See application file for complete search history.

(56) References Cited

U.S. PATENT DOCUMENTS 5,459,607 A * 10/1995 Fellows et al. ............. 398/154

(Continued)

FOREIGN PATENT DOCUMENTS

| EP | 1041852 A | 10/2000 |
|---|---|---|
| WO | WO 00/74278 | 12/2000 |

OTHER PUBLICATIONS

K. Reichmann et al., "Broadcast Digital Video as a Low-Cost Overlay to Baseband Digital-Switched Services on a PON", OFC '96, 1996.*

(Continued)

Primary Examiner—Shi K. Li
(74) Attorney, Agent, or Firm—Baker Botts L.L.P.

(57) ABSTRACT

A single fiber passive optical network (PON) wavelength division multiplex (WDM) overlay includes a central office, a fiber optic network, and a plurality of optical network termination (ONT) units. The central office has a baseline optical link that receives a baseline communication signal and converts the baseline communication signal into a downstream baseline optical signal within a first optical bandwidth, and has an additional optical link that receives a second type of communication signal and converts the second type of communication signal into a second downstream optical signal within a second optical bandwidth. The downstream baseline optical signal generated by the baseline optical link is combined with the second optical signal generated by the additional optical link to generate a broadband optical signal. The fiber optic network is coupled to the central office and receives the broadband optical signal on at least one optic fiber. The fiber optic network splits the broadband optical signal to a plurality of fiber drops. The optical network termination (ONT) units are each coupled to a fiber drop. At least one of the ONT units is a baseline ONT unit that receives the broadband optical signal from the fiber drop and splits the downstream baseline optical signal from the broadband optical signal, and at least one other of the ONT units is an upgraded ONT unit that receives the broadband optical signal from the fiber drop and splits the downstream baseline optical signal and the second downstream optical signals from the broadband optical signal. In addition, the installation of the upgraded ONT unit to the PON does not effect baseline optical service to any other ONT unit.

32 Claims, 4 Drawing Sheets

U.S. PATENT DOCUMENTS 5,864,413 A    1/1999   Feldman et al.
5,896,474 A *  4/1999   Van Deventer et al. ....... 385/24
RE36,471 E *  12/1999   Cohen ......................... 398/82
6,577,414 B1 * 6/2003   Feldman et al. ............ 725/129

OTHER PUBLICATIONS

Feldman, R.D., et al., "Broadband Upgrade of an Operating Narrowband Single-Fiber Passive Optical Network Using Coarse Wavelength Division Multiplexing and Subcarrier Multiple Access", Journal of Lightwave Technology, IEEE, New York, vol. 16, No. 1 1998, pp. 1-8.

Lo, D.C., "A Hybrid Lightwave Transmission System for Subcarrier Multiplexed Video and digital B-IsDN Services in the Local Loop", Journal of Lightwave Technolog, IEEE, New York, vol. 7, No. 11, Nov. 1, 1989, pp. 1839-1848.

* cited by examiner

SINGLE FIBER PASSIVE OPTICAL NETWORK WAVELENGTH DIVISION MULTIPLEX OVERLAY

CROSS REFERENCE TO RELATED APPLICATION

This application claims priority from and is related to the following prior application: Single Fiber Passive Optical Network Wavelength Division Multiplex Overlay With Route Protection, Hitless Upgrade and Direction Diversity Isolation, U.S. Provisional Application No. 60/306,907, filed Jul. 20, 2001. This prior application, including the entire written description and drawing figures, is hereby incorporated into the present application by reference.

FIELD OF THE INVENTION

The present invention relates generally to the field of broadband multi-media communication systems. More specifically a single fiber passive optical network wavelength division multiplex overlay is provided that enables a baseline single fiber passive optical network to be upgraded on a subscriber by subscriber basis with a multiplicity of different optical communication links operating at different optical wavelengths from the baseline link.

BACKGROUND

Prior to the explosive growth in the public's demand for data services, such as dial-up Internet access, the local loop access network transported mostly voice information. This present access network typically includes numerous twisted-pair wire connections between the plurality of user locations and a central office switch (or terminal). These connections can be multiplexed in order to more efficiently transport voice calls to and from the central office. The present access network for the local loop is designed primarily to carry these voice signals, i.e., it is a voice-centric network.

Today, data traffic carried across telephone networks is growing exponentially, and by many measures may have already surpassed traditional voice traffic, due in large measure to the explosive growth of dial-up data connections. The basic problem with transporting data traffic over this voice-centric network, and in particular the local loop access part of the network, is that it is optimized for voice traffic, not data. The voice-centric structure of the access network limits the ability to receive and transmit high-speed data signals along with traditional quality voice signals. Simply put, the access part of the network is not well matched to the type of information it is now primarily transporting. As users demand higher and higher data transmission capabilities, the inefficiencies of the present access network will cause user demand to shift to other mediums of transport for fulfillment, such as satellite transmission, cable distribution, wireless services, etc.

An alternative present local access network that is available in some areas is a digital loop carrier ("DLC") system. DLC systems utilize fiber-optic distribution links and remote multiplexing devices to deliver voice and data signals to and from the local users. An early DLC system is described in U.S. Pat. No. 5,046,067 titled "Digital Transmission System" ("the '067 patent"). The '067 patent describes a Digital Loop Carrier (DLC) system. In a typical DLC system, a fiber optic cable is routed from the central office terminal (COT) to a host digital terminal (HDT) located within a particular neighborhood. Telephone lines from subscriber homes are then routed to circuitry within the HDT, where the telephone voice signals are converted into digital pulse-code modulated (PCM) signals, multiplexed together using a time-slot interchanger (TSI), converted into an equivalent optical signal, and then routed over the fiber optic cable to the central office. Likewise, telephony signals from the central office are multiplexed together, converted into an optical signal for transport over the fiber to the HDT, converted into corresponding electrical signals at the HDT, demultiplexed and routed to the appropriate subscriber telephone line twisted-pair connection.

Some DLC systems have been expanded to provide so-called Fiber-to-the-Curb (FTTC) systems. In these systems, the fiber optic cable is pushed deeper into the access network by routing fiber from the HDT to a plurality of Optical Network Units (ONUs) that are typically located within 500 feet of a subscriber's location. Multi-media voice, data, and even video from the central office location is transmitted to the HDT. From the HDT, these signals are transported over the fibers to the ONUs, where complex circuitry inside the ONUs demultiplexes the data streams and routes the voice, data and video information to the appropriate subscriber.

SUMMARY

A single fiber passive optical network (PON) wavelength division multiplex (WDM) overlay includes a central office, a fiber optic network, and a plurality of optical network termination (ONT) units. The central office has a baseline optical link that receives a baseline communication signal and converts the baseline communication signal into a downstream baseline optical signal within a first optical bandwidth, and has an additional optical link that receives a second type of communication signal and converts the second type of communication signal into a second downstream optical signal within a second optical bandwidth. The downstream baseline optical signal generated by the baseline optical link is combined with the second optical signal generated by the additional optical link to generate a broadband optical signal. The fiber optic network is coupled to the central office and receives the broadband optical signal on at least one optic fiber. The fiber optic network splits the broadband optical signal to a plurality of fiber drops. The optical network termination (ONT) units are each coupled to a fiber drop. At least one of the ONT units is a baseline ONT unit that receives the broadband optical signal from the fiber drop and splits the downstream baseline optical signal from the broadband optical signal, and at least one other of the ONT units is an upgraded ONT unit that receives the broadband optical signal from the fiber drop and splits the downstream baseline optical signal and the second downstream optical signals from the broadband optical signal. In addition, the installation of the upgraded ONT unit to the PON does not effect baseline optical service to any other ONT unit.

DETAILED DESCRIPTION

I. Enhanced Band Broadcast Sub-Carrier Modulated (SCM) Upgrade

Figure 1:
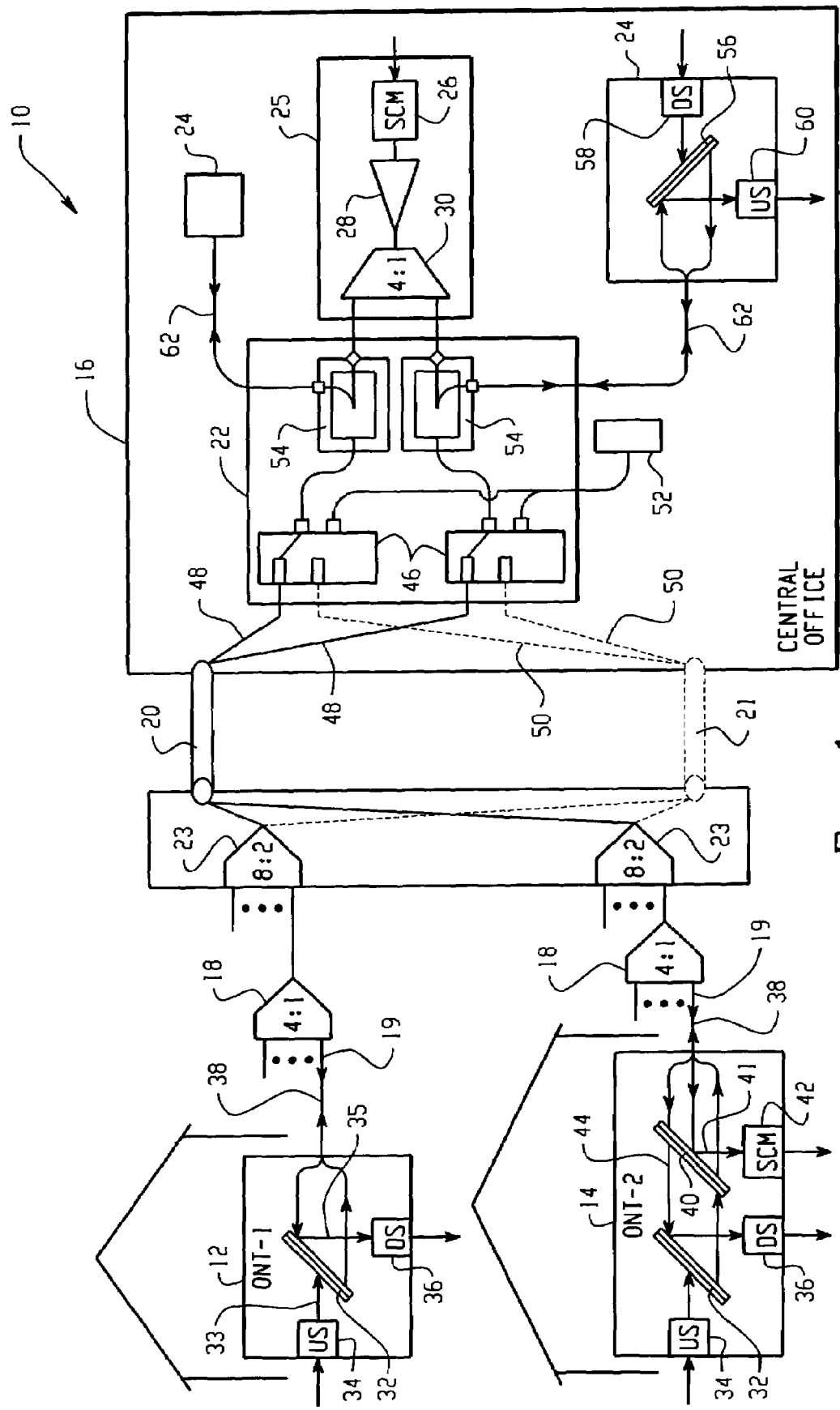
FIG. 1 is a block diagram of an exemplary single fiber passive optical network wavelength division multiplex overlay that includes an enhanced band broadcast sub-carrier modulated (SCM) signal upgrade.

Referring now to the drawing figures, FIG. 1 is a block diagram of an exemplary single fiber passive optical network wavelength division multiplex overlay 10 that includes an enhanced band broadcast sub-carrier modulated (SCM) signal upgrade. The system 10 includes a plurality of baseline optical network termination (ONT) units 12, at least one sub-carrier modulated (SCM) upgraded ONT unit 14, a fiber optic network 18-23, and a central office 16. The system 10 is preferably a passive optical network, such as a fiber to the home (FTTH) or fiber to the curb (FTTC), or fiber to the business (FTTB), that may be upgraded to include a SCM signal, such as a CATV television signal or a DBS signal, on a subscriber by subscriber basis without affecting non-upgraded subscribers.

Multimedia communication signals, such as plain-old-telephone signals (POTS), data network signals, CATV signals and DBS signals, are received from various service providers at the central office (CO) 16. The central office (CO) 16 converts the multimedia signals into optical signals at different wavelengths and multiplexes the various optical multimedia signals onto single fibers in the fiber optic network 18-23. The fiber optic network 18-23 distributes the optical signals to optical network termination (ONT) units 12, 14, which filter or demultiplex the optical signals into their individual multimedia components, and convert the filtered optical signals into electrical signals for use in the home or office. An upgraded SCM ONT unit 14 may filter a received optical signal into its baseline (telephony/data) and SCM components, and a non-upgraded baseline ONT unit 12 may filter a received optical signal into a baseline signal without being affected by the SCM component of the received signal. In addition, in a bi-directional system, both the non-upgraded baseband ONT units 12 and the upgraded SCM ONT units 14 may convert baseline transmissions from the home (i.e., upstream telephony/data signals) into optical signals at a different optical wavelength than the incoming (i.e., downstream) signals and transmit the signals over the fiber optic network 18-23 to the CO 16.

A. Fiber Optic Network

The fiber optic network 18-23 shown in FIG. 1 is a point-to-multipoint single fiber network that includes an outside plant 20, 21, a plurality of passive remote splitters 23, and a plurality of distribution splitters 18. The outside plant 20, 21 includes individual optic fibers or bundles of individual optical fibers with each individual fiber coupled between a route protection switch 46 in the central office 16 and a passive remote splitter 23. The illustrated embodiment includes two optic paths, a main path 20 and a redundant path 21, between the central office 16 and the passive remote splitters 23. Each route protection switch 46 in the central office 16 is, therefore, coupled to one passive remote splitter 23 via two individual optic fibers—one main fiber and one redundant fiber.

Each individual fiber and its redundant pair in the illustrated outside plant 20, 21 may provide service to thirty-two (32) homes. The passive remote splitters 23 are eight-to-two (8:2) splitters that divide the main and redundant fibers 20, 21 into eight distribution fibers. The optical signals are transmitted for short distances over the distribution fibers, without amplification, before termination at a four-to-one (4:1) distribution splitter 18 located in close proximity to four ONT units. A distribution splitter 18 terminates a distribution fiber to four single drop fibers 19 that extend from the distribution splitter 18 to a home or office and terminate at an ONT unit 12, 14. The distribution splitters 18, the fiber drops 19, and the ONT units 12, 14 are added to the system 10 as service is required.

B. Central Office

The central office 16 shown in FIG. 1 includes a passive cross-connection unit 22, an optical video distribution subsystem 25, two baseline optical line termination (OLT) units 24, and a route protection control circuit 52. In operation, the central office 16 interfaces the fiber optic network 18-23 with communication service providers, such as CATV, DBS, and telephony/data services.

The baseline OLT units 24 each include a baseline splitting-blocking filter combination 56, a downstream (DS) optical-electrical converter (OEC) 58, and an upstream optical-electrical converter 60. The downstream OEC 58 receives telephony/data signals from POT and data network service providers, for example over a public telephone network, and converts the telephony/data signals into optical signals at a selected optical bandwidth for transmission to the ONT units 12, 14. Each baseline OLT unit 24 may provide optical telephony/data signals, without amplification, to a set number of ONT units 12, 14. For example, in the illustrated embodiment, each baseline OLT unit 24 can supply thirty-two (32) ONT units 12, 14. If more than thirty-two (32) ONT units 12, 14 require baseline service, then additional baseline OLT units 24 must be added at the CO 16. The illustrated CO 16 includes two baseline OLT units 24, and can thus supply sixty-four (64) ONT units 12, 14, without amplification.

The baseline splitting-blocking filter combination 56 in an OLT unit 24 receives an optical downstream signal from the downstream OEC 58 and also receives an upstream signal from the fiber optic network 18-23 via a fiber connection 62 with the passive cross-connection unit 22. The baseline splitting-blocking filter combination 56 passes the downstream telephony/data signals to the fiber connection 62 with the passive cross-connection unit 22, and splits the upstream (US) telephony/data signal received from the passive cross-connection unit 22. The isolated upstream (US) telephony/data signals are converted into electrical signals by the upstream OEC 60, and are transmitted to the service provider. In a bi-directional system, the upstream (US) telephony/data signals are transmitted at a different bandwidth and on the same optic fiber as the downstream (DS) telephony/data signals. Exemplary optical bandwidths for the upstream and downstream telephony/data signals are described below with reference to FIG. 2.

The optical video distribution sub-system 25 includes an SCM module 26, a high power optical amplifier 28, and an optical splitter 30. The SCM module 26 receives video signals, such as CATV or DBS signals, that enter the CO 16 from the service provider head-end and/or satellite. The SCM module 26 combines the video signals from the service providers into one optical signal at a selected bandwidth. An exemplary optical bandwidth for the SCM signal is described below with reference to FIG. 2. The optical SCM signal from the SCM module 26 is then amplified by the high power optical amplifier 28, and split into a plurality of optical SCM transmission signals by the optical splitter 30.

The passive cross-connection unit 22 includes a plurality of wave division multiplexers (WDMs) 54 and a plurality of optical route protection switches 46. The WDMs 54 each include two inputs—one input coupled to an optical SCM signal generated by the optical video distribution sub-system 25, and one input coupled to the optical output 62 from a baseline OLT unit 24. The WDMs 54 combine the downstream telephony/data signal from the baseline OLT unit 24 and the SCM signal from the optical video distribution sub-system 24 into one broadband optical signal.

The broadband optical signals generated by the WDMs 54 are coupled to the fiber optic network 18-23 through the optical route protection switches 46. Each optical route protection switch 46 includes an input that receives a broadband optical signal from a WDM 54, a control input from the route protection control circuit 52, and two optical fiber outputs 48, 50. The two optical fiber outputs 48, 50 from an optical route protection switch 46 are coupled to a passive remote splitter 23 through separate paths in the outside plant 20, 21. The route protection control circuit 52 monitors the optical continuity of the outside plant 20, 21, and routes the broadband optical signal through either the main or redundant path 20, 21 to adjust for any discontinuity. For example, the optical route protection switches 46 may be configured to connect the broadband optical signals to the main path 48, 20 during normal operation. If the route protection control circuit 52 detects a discontinuity in the main path 20, then the route protection control circuit 52 may cause one or more of the optical route protection switches 46 to switch the broadband optical signals from one or more individual optic fibers in the main path 20 to the corresponding redundant fibers in the redundant path 50, 23 in order to prevent interruptions in service.

C. Optical Network Termination (ONT) Units

Two types of optical network termination (ONT) units are illustrated in FIG. 1: a SCM upgraded ONT unit 14, and a non-upgraded baseline ONT unit 12. Both the SCM upgraded ONT units 14 and the non-upgraded baseline ONT units 12 may be used to transmit and receive baseline telephony/data signals via the fiber optic network 18-23. The SCM upgraded ONT units 12, however, may also receive broadcast video signals, such as CATV or DBS signals, over the same optic fiber without affecting baseline service to the non-upgraded ONT units 12.

A baseline ONT unit 12 includes a baseline splitting-blocking filter combination 32, a downstream (DS) optical-electrical converter (OEC) 36, and an upstream optical-electrical converter (OEC) 34. The baseline splitting-blocking filter combination 32 receives a broadband optical signal 32 from a fiber drop 19 and filters the signal 32 to isolate downstream (DS) telephony/data signals 35, which fall within a designated optical bandwidth. The downstream (DS) telephony/data signals are coupled to the downstream (DS) optical-electrical converter (OEC) 36, which converts the optical telephony/data signals into electrical signals for use by equipment within the home or office. In addition, the baseline splitting-blocking filter combination 32 also receives upstream (US) telephony/data signals 33 and passes the upstream (US) signals to the fiber drop 19 for transmission to the central office 16 via the fiber optic network 18-23. The upstream (US) telephony/data signals are generated by equipment within the home or office, and converted to optical signals by the upstream (US) OEC 34. As noted above, the upstream (US) telephony/data signals in a bi-directional system are transmitted at a different bandwidth and on the same optic fiber as the downstream (DS) telephony/data signals.

An upgraded SCM ONT unit 14 is similar to the baseline ONT unit 12, with the inclusion of a SCM splitting-blocking filter combination 40 and a SCM optical-electrical converter (OEC) 42. The broadband optical signal 38 from the fiber drop 19 is received by the SCM splitting-blocking filter combination 40 which filters the broadband signal 38 to isolate optical SCM signals 41 and to pass baseline telephony/data signals 44. The isolated SCM signals 41 are coupled to the SCM OEC 42, and the isolated baseline telephony/data signals 44 are coupled to the baseline splitting-blocking filter combination 32. The SCM optical-electrical converter 42 converts the optical SCM signals 41 into electrical signals for use by video equipment within the home or office. The baseline splitting-blocking filter combination 32 filters the baseline telephony/data signals 44 to isolate downstream (DS) telephony/data signal 35 which are converted to electrical signals by the downstream (DS) OEC 36. In addition, both the baseline splitting-blocking filter combination 32 and the SCM splitting-blocking filter combination 40 pass upstream (US) telephony/data signals 33 for transmission to the central office 16 via the optical network 18-23.

D. Optical Bandwidths

Figure 2:
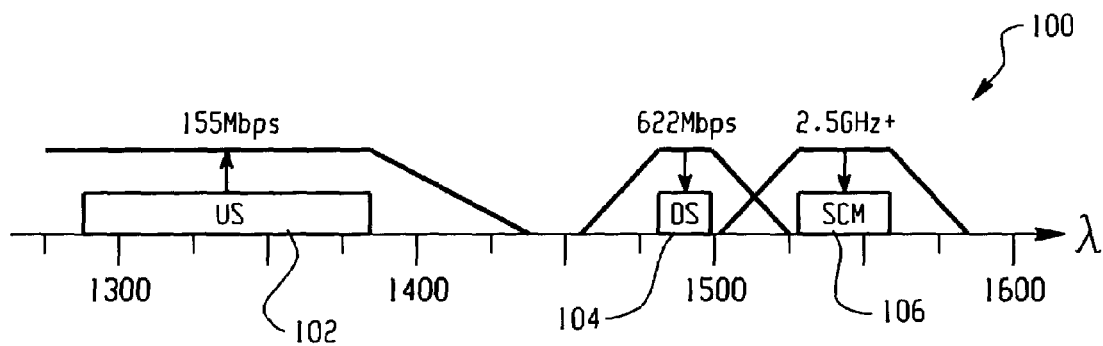
FIG. 2 is a graph illustrating exemplary bandwidths for the communication signals transmitted over the single fiber passive optical network shown in FIG. 1.

FIG. 2 is a graph illustrating exemplary bandwidths for the communication signals transmitted over the single fiber passive optical network 10 shown in FIG. 1. As illustrated, an upstream (US) telephony/data signal 102, a downstream (DS) telephony/data signal 104 and a SCM signal 106 are each transmitted at different wavelengths over the same optic fiber. The upstream (US) telephony/data signal 102 may have a bandwidth of about 1260-1360 nm, the downstream (DS) telephony/data signal 104 may have a bandwidth of about 1480-1500 nm, and the SCM signal 106 may have a bandwidth of about 1535-1565 nm. Also illustrated in FIG. 2 are the filter characteristics of the baseline and SCM splitting-blocking filters 32, 40, 56 in the ONTs 12, 14 and at the central office 16. The baseline splitting-blocking filters 32, 56 include a bandpass filtering characteristic (between about 1460 and 1525 nm) that isolates or passes downstream (DS) signals, and a low-lass filtering characteristic (below about 1430 nm) that isolates or passes upsteam (US) signals. The SCM splitting-blocking filter 40 includes a bandpass filtering characteristic (between about 1510 and 1580 nm) that isolates SCM signals.

As noted above, the passive optical network 10 may be a bi-directional system in which both upstream and downstream signals are transmitted, at different wavelengths, on the same optic fiber. The downstream (DS) telephony/data signals 104 and the SCM signals 106 are multiplexed into broadband signals that are transmitted from the central office 16 to both the non-upgraded baseline ONT units 12 and the upgraded SCM ONT units 14. The direction of the multiplexed SCM and DS signals 104, 106 in the bi-directional system 10 is illustrated in FIG. 2 by the downward pointing arrows. The upstream (US) telephony/data signals 102 are transmitted from the ONT units 12, 14 to the central office 16 over the same optic fibers as the multiplexed DS and SCM signals 104, 106. The direction of the US signals 102 in the bi-directional system 10 is illustrated in FIG. 2 by the upward pointing arrow.

II. Course Wavelength Division Multiplexing (CWDM) T-Band Upgrade

Figure 3:
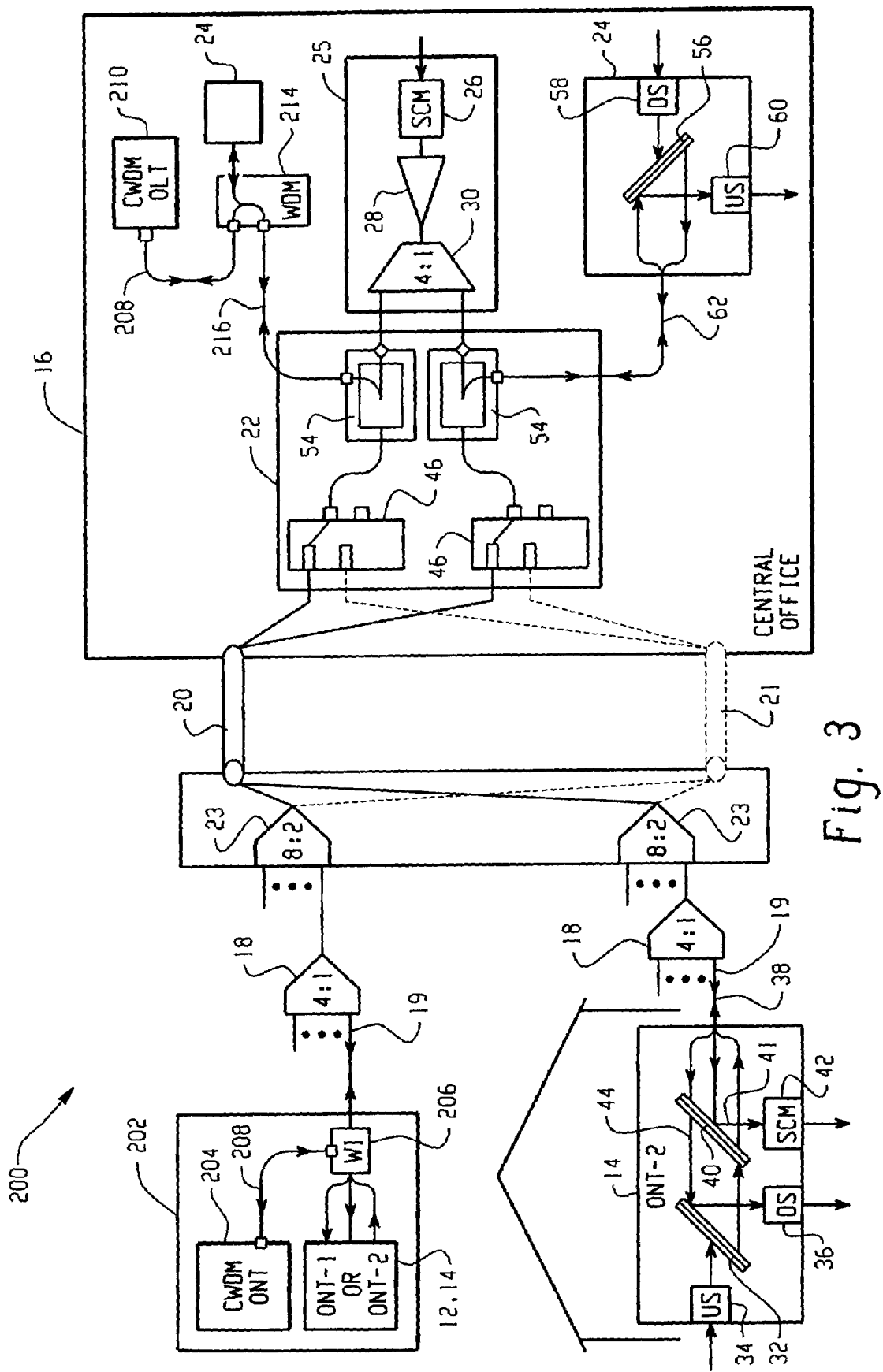
FIG. 3 is a block diagram of an exemplary single fiber passive optical network wavelength division multiplex overlay that includes a course wavelength division multiplexing (CWDM) T-Band upgrade.

FIG. 3 is a block diagram of an exemplary single fiber passive optical network (PON) wavelength division multiplex overlay 200 that includes a course wavelength division multiplexing (CWDM) T-Band upgrade. This CWDM T-Band upgraded PON 200 is similar to the SCM upgraded PON 10 described above with reference to FIGS. 1 and 2, except the CWDM T-Band upgrade 200 also enables T-Band CWDM signals to be transmitted on the same optic fibers as the baseline and SCM signals without affecting subscribers that have not upgraded to a T-Band upgraded optical network termination (ONT) unit 202. The CWDM T-Band upgrade may, for example, be added to a baseline system or the SCM upgraded PON 10 described above without any substantial effect to the existing services.

A. Central Office

The central office 16 in the CWDM T-Band upgraded PON 200 includes the passive cross-connection unit 22, optical video distribution sub-system 25, and baseline optical line termination (OLT) units 24, as described above with reference to FIG. 1. In addition, the central office 16 is upgraded to include a CWDM optical line termination (OLT) unit 210 and an additional WDM multiplexer 214. It should be understood, however, that in other embodiments the CWDM upgrade may be added to a baseline PON that does not include an SCM upgrade.

The CWDM OLT unit 210 in the CO 16 receives multimedia transmissions from a service provider and multiplexes the multimedia signals into an optical downstream T-Band signal 208. A T-Band signal may, for example, be used to provide an upgraded CWDM ONT unit 202 with a higher data rate link than that available from a baseline service, or for other high bandwidth applications. In addition, several different multimedia signals may be simultaneously transmitted at different wavelengths within the mulitplexed CWDM T-Band signal 208. For instance, a CWDM service provider may offer one type of service, such as a video or data service, carried over one wavelength in the T-Band signal, and another type of service, such as voice, simultaneously carried over another wavelength.

The downstream T-Band signal 208 generated by the CWDM OLT 210 is combined with a downstream (DS) baseline signal by the WDM multiplexer 214 to generate a multiplexed CWDM/baseline output signal 216. The output signal 216 from the WDM multiplexer 214 is then coupled as one of the inputs to a WDM multiplexer 54 in the cross-connection unit 22, which combines the multiplexed CWDM/baseline signal 216 with a SCM signal from the optical video distribution sub-system 25 to generate the broadband signal transmitted over the optical network 12-23. With respect to incoming signals from the ONTs 12, 14, 202, the additional WDM multiplexer 214 also operates as a demultiplexer to separate upstream T-Band signals generated at a T-Band upgraded ONT unit 202 from upstream (US) baseline signals. The isolated upstream (US) baseline signals are coupled to the baseline OLT 24 and transmitted to the baseline service provider as described above. The isolated upstream CWDM T-Band signals are coupled to the CWDM OLT 210, which separates the T-Band signal into its multimedia components, and transmits the signals to the service provider.

B. T-Band Upgraded ONT Unit

The T-Band upgraded ONT unit 202 includes a CWDM ONT unit 204, a WDM multiplexer (W1) 206, and either a baseline ONT unit 12 or a SCM upgraded ONT unit 14. In operation, the T-Band upgraded ONT unit 202 may send and receive T-Band signals 208 over the fiber optic network 18-23 using the CWDM ONT unit 204, and, depending on the additional services purchased, may also receive baseline telephony/data service and video service with an integral baseline or SCM upgraded ONT unit 12, 14.

The WDM multiplexer (W1) 206 in the T-Band upgraded ONT unit 202 is coupled to a fiber drop 19 in the fiber optic network 18-23, and receives incoming broadband optical signals that may include downstream baseline, SCM, and downstream T-Band signal components. With respect to the incoming signals, W1 206 operates as a demultiplexer to separate the downstream T-Band signal components from the downstream baseline and SCM signal components. The downstream T-Band signals are coupled to the CWDM ONT unit 202, and the downstream baseline and SCM signals are coupled to the integral baseline or SCM upgraded ONT unit 12, 14. The CWDM ONT unit 202 splits the downstream T-Band signal 208, and demultiplexes the CWDM T-Band signal 208 into its multimedia components. In addition, upstream CWDM T-Band signals 208 generated by the CWDM ONT unit 202 are combined with upstream (US) baseline signals by the WDM multiplexer (W1) 206, and are transmitted to the CO 16 via the fiber optic network 18-23.

C. Optical Bandwidths

Figure 4:
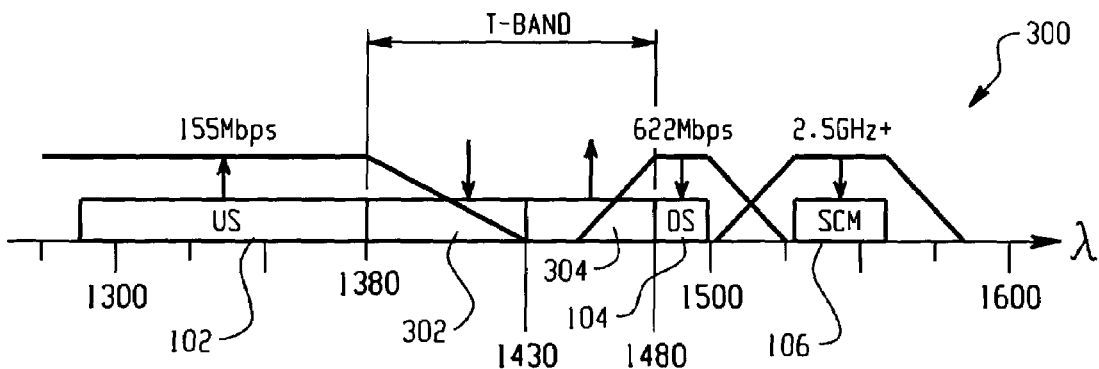
FIG. 4 is a graph illustrating exemplary bandwidths for the communication signals transmitted over the single fiber passive optical network shown in FIG. 3.

FIG. 4 is a graph 300 illustrating exemplary bandwidths for the communication signals transmitted over the single fiber passive optical network 200 shown in FIG. 3. As illustrated, an upstream (US) telephony/data signal 102, a downstream (DS) telephony/data signal 104, a SCM signal 106, a downstream T-Band signal 302, and an upstream T-Band signal 304 are each transmitted at different wavelengths over the same optic fiber. As noted above, the upstream (US) telephony/data signal 102 may have a bandwidth of about 1260-1360 nm, the downstream (DS) telephony/data signal 104 may have a bandwidth of about 1480-1500 nm, and the SCM signal 106 may have a bandwidth of about 1535-1565 nm. In addition, the downstream and upstream T-Band signals 302, 304 may fill the available bandwidth (1360-1480 nm) between the US and DS baseline signals 120, 104. The downstream T-Band signals 302 may have a bandwidth of about 1360-1430 nm, and the upstream T-Band signal 304 may have a bandwidth of about 1430-1480 nm.

Also illustrated in FIG. 4 are the filter characteristics of the baseline and SCM splitting-blocking filters 32, 40, 56 in the ONTs 12, 14 and at the central office 16, as described above. In addition, the direction (i.e., upstream or downstream) of the signals is illustrated in FIG. 4 by the direction of the arrows above the bandwidth for the particular signal type. Upward-facing arrows represent upstream signals, and downward-facing arrows represent downstream signals.

III. Dense Wavelength Division Multiplexing (DWDM) L-Band Upgrade

Figure 5:
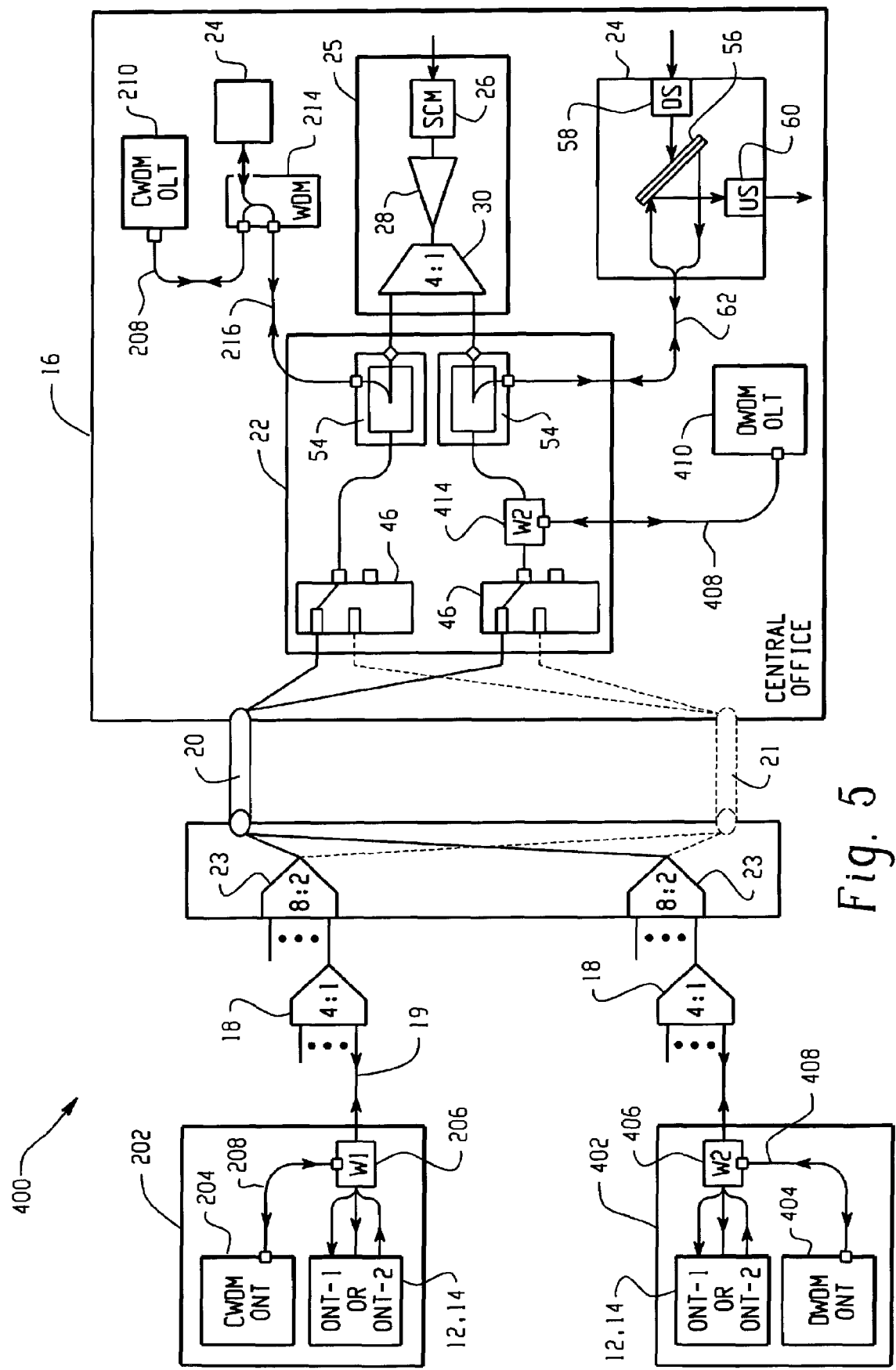
FIG. 5 is a block diagram of an exemplary single fiber passive optical network wavelength division multiplex overlay that includes a dense wavelength division multiplexing (DWDM) L-Band upgrade.

FIG. 5 is a block diagram of an exemplary single fiber passive optical network wavelength division multiplex overlay 400 that includes a dense wavelength division multiplexing (DWDM) L-Band upgrade. This DWDM L-Band upgraded PON 400 is similar to the CWDM T-Band upgraded PON 200 described above with reference to FIG. 3, except the DWDM L-Band upgrade 400 also enables L-Band DWDM signals to be transmitted on the same optic fibers as the baseline, SCM, and T-Band signals without affecting subscribers that have not upgraded to an L-Band upgraded ONT unit 402.

A. Central Office

The central office (CO) 16 in the DWDM L-Band upgraded PON 400 includes optical video distribution subsystem 24, baseline OLT units 24, and CWDM OLT unit 210, as described above with reference to FIG. 3. In addition, the CO 16 is upgraded to include a DWDM OLT unit 410, and the cross-connection unit 22 is upgraded to include an additional WDM multiplexer (W2) 414. It should be understood, however, that in other embodiments the DWDM L-Band upgrade could be added to a baseline PON that does not include a SCM or CWDM upgrade.

The DWDM OLT unit 410 in the CO 16 receives multimedia transmissions from a service provider and multiplexes the multimedia signals into an optical downstream L-Band signal 408. The DWDM multiplexing scheme employed by the DWDM OLT unit 410 is similar to the CWDM multiplexing scheme of the CWDM OLT unit 210, as described above. An L-Band DWDM multiplexer, however, combines multiple signals at a higher frequency and less sensitive bandwidth than a T-Band CWDM multiplexer, and can, therefore, combine more signals into a lesser amount of bandwidth. Other advantages of L-Band transmission over T-Band transmission are generally known to those skilled in the art of passive optical networks.

The downstream L-Band signal 408 generated by the DWDM OLT 410 is coupled to an input of the additional WDM multiplexer (W2) 414 in the cross-connection unit 22, which combines the L-Band signal 408 with a broadband signal generated by one of the other WDM multiplexers 54 in the cross-connection unit 22. With respect to incoming signals from the ONTs 12, 14, 202, 402, the additional WMD multiplexer (W2) 414 in the cross-connection unit 22 operates as a demultiplexer to separate upstream L-Band signals 408 generated as an L-Band upgraded ONT unit 402 from other upstream signals. The isolated upstream L-Band signals 408 are coupled to the DWDM OLT 410, which separates the L-Band signal into its multimedia components, and transmits the signals to a service provider.

B. L-Band Upgraded ONT Unit

The L-Band upgraded ONT unit 402 includes a DWDM ONT unit 404, a WDM multiplexer (W2) 406, and either a baseline ONT unit 12 or a SCM upgraded ONT unit 14. In operation, the L-Band upgraded ONT unit 402 may send and receive L-Band signals 408 over the fiber optic network 18-23 using the DWDM ONT unit 404, and, depending on the additional services purchased, may also receive baseline telephony/data service and video service with an integral baseline or SCM upgraded ONT unit 12, 14.

The WDM multiplexer (W2) 406 in the L-Band upgraded ONT unit 402 is coupled to a fiber drop 19 in the fiber optic network 18-23, and receives incoming broadband optical signals that may include downstream baseline, SCM, downstream T-Band, and downstream L-Band components. With respect to the incoming signals, W2 406 operates as a demultiplexer to separate the downstream L-Band signal components from other components of the incoming broadband signal. The downstream L-Band signals 408 are coupled to the DWDM ONT unit 404, and the other signal components are coupled to the integral baseline or SCM upgraded ONT unit 12, 14. The DWDM ONT unit 404 splits the downstream L-Band signal 408, and demultiplexes the L-Band signal 408 into its multimedia components. In addition, upstream DWDM L-Band signals 408 generated by the DWDM ONT unit 404 are combined with upstream (US) baseline signals by the WDM multiplexer (W2) 406, and are transmitted to the CO 16 via the fiber optic network 18-23.

C. Optical Bandwidths

Figure 6:
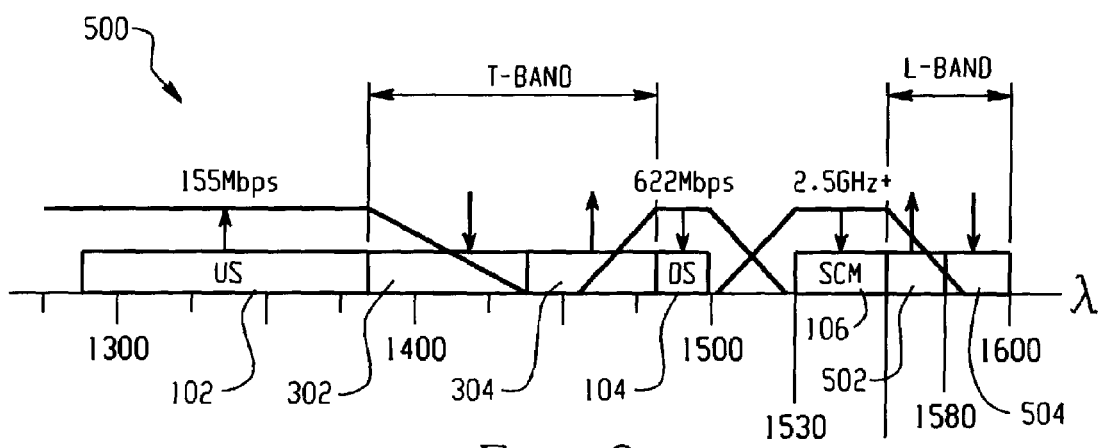
FIG. 6 is a graph illustrating exemplary bandwidths for the communication signals transmitted over the single fiber passive optical network shown in FIG. 5.

FIG. 6 is a graph 500 illustrating exemplary bandwidths for the communication signals transmitted over the single fiber passive optical network 400 shown in FIG. 5. As illustrated, an upstream DWDM L-Band signal 502 and a downstream DWDM L-Band signal 504 are transmitted over a single optic fiber and at different wavelengths than baseline, SCM, and CWDM T-Band signals. As noted above, the upstream (US) telephony/data signal 102 may have a bandwidth of about 1260-1360 nm, the downstream (DS) telephony/data signal 104 may have a bandwidth of about 1480-1500 nm, the SCM signal 106 may have a bandwidth of about 1535-1565 nm, the downstream T-Band signals 302 may have a bandwidth of about 1360-1430 nm, and the upstream T-Band signal 304 may have a bandwidth of about 1430-1480 nm. In addition, the DWDM L-Band signals 502, 504 may fill the available high-frequency bandwidth (1560-1600 nm) above the SCM signal 106. The upstream L-Band signal 502 may have a bandwidth of about 1560-1580 nm, and the downstream L-Band signal 504 may have a bandwidth of about 1580-1600 nm.

Also illustrated in FIG. 5 are the filter characteristics of the baseline and SCM splitting-blocking filters 32, 40, 56 in the ONTs 12, 14 and at the central office 16, as described above. In addition, the direction (i.e., upstream or downstream) of the various signals is illustrated in FIG. 5 by the direction of the arrows above the bandwidth for the particular signal type. Upward-facing arrows represent upstream signals, and downward-facing arrows represent downstream signals.

This written description uses examples to disclose the invention, including the best mode, and also to enable any person skilled in the art to make and use the invention. The patentable scope of the invention is defined by the claims, and may include other examples that occur to those skilled in the art.

We claim:

1. A system for upgrading a baseline passive optical network (PON), comprising:

a central office having a baseline optical link that receives a baseline communication signal from one or more service provider and converts the baseline communication signal into a downstream baseline optical signal within a first optical bandwidth, and having an additional optical link that receives a second type of communication signal and converts the second type of communication signal into a second downstream optical signal within a second optical bandwidth, wherein the downstream baseline optical signal is combined with the second downstream optical signal to generate a broadband optical signal;

a fiber optic network coupled to the central office that receives the broadband optical signal on at least one optic fiber and splits the broadband optical signal to a plurality of fiber drops; and a plurality of optical network termination (ONT) units with each ONT unit coupled to a fiber drop, wherein at least one of the ONT units is a baseline ONT unit that receives the broadband optical signal from the fiber drop and splits the downstream baseline optical signal from the broadband optical signal, and wherein at least one other of the ONT units is an upgraded ONT unit that includes a first filter operable to receive the broadband optical signal from the fiber drop and isolate the second downstream optical signal from the broadband optical signal, the upgraded ONT unit including a second filter operable to isolate the downstream baseline optical signal from a remaining portion of the broadband optical signal after the second downstream optical signal has been isolated from the broadband optical signal, the first and second filters operable to pass an upstream optical signal to the fiber drop;

wherein the installation of the upgraded ONT unit to the PON does not effect baseline optical service to any other ONT unit.

2. The system of claim 1, wherein the central office includes a wavelength division multiplexer (WDM) that combines the downstream baseline optical signal with the second downstream optical signal.

3. The system of claim 1, wherein the baseline optical link is a baseline optical line termination (OLT) unit.

4. The system of claim 1, wherein the baseline communication signal includes a telephony signal.

5. The system of claim 1, wherein the baseline communication signal includes a data transmission signal.

6. The system of claim 1, wherein the second type of communication signal is a sub-carrier modulated (SCM) signal.

7. The system of claim 6, wherein the SCM signal includes a community antenna television (CATV) signal.

8. The system of claim 6, wherein the SCM signal includes a direct broadcast satellite (DBS) signal.

9. The system of claim 6, wherein the additional optical link is an optical video distribution sub-system.

10. The system of claim 9, wherein the optical video distribution sub-system comprises an SCM module that receives the SCM signal from one or more service providers and converts the SCM signal into the second downstream optical signal.

11. The system of claim 1, wherein the second downstream optical signal is a T-Band signal.

12. The system of claim 11, wherein the upgraded ONT unit is a T-Band upgraded ONT unit that includes a wave division multiplexer (WDM) that separates the T-Band signal from the broadband optical signal.

13. The system of claim 11, wherein the additional optical link is a course wavelength division multiplexing (CWDM) optical line termination (OLT) unit.

14. The system of claim 13, wherein the upgraded ONT unit is a T-Band upgraded ONT unit that includes a wave division multiplexer (WDM) that separates the T-Band signal from the broadband optical signal, and wherein the T-Band upgraded ONT unit includes a CWDM ONT unit that receives the T-Band signal from the WDM and demultiplexes the T-Band signal.

15. The system of claim 1, wherein the second downstream optical signal is an L-Band signal.

16. The system of claim 15, wherein the upgraded ONT unit is an L-Band upgraded ONT unit that includes a wave division multiplexer (WDM) that separates the L-Band signal from the broadband optical signal.

17. The system of claim 15, wherein the additional optical link is a dense wavelength division multiplexing (DWDM) optical line termination (OLT) unit.

18. The system of claim 17, wherein the upgraded ONT unit is an L-Band upgraded ONT unit that includes a wave division multiplexer (WDM) that separates the L-Band signal from the broadband optical signal, and wherein the L-Band upgraded ONT unit includes a DWDM ONT unit that receives the L-Band signal from the WDM and demultiplexes the L-Band signal.

19. The system of claim 1, wherein the fiber optic network is a point-to-multipoint network.

20. The system of claim 1, wherein the central office includes a cross-connection unit that couples the broadband optical signal to the fiber optic network.

21. The system of claim 20, wherein the cross-connection unit includes a wavelength division multiplexer (WDM) that combines the downstream baseline optical signal with the second downstream optical signal.

22. The system of claim 20, wherein the fiber optic network includes at least two optic paths between the central office each ONT unit, and wherein the cross-connection unit includes an optical route protection switch that switchably connects the broadband optical signal to one of the optic paths.

23. The system of claim 22, wherein the central office includes a route protection control circuit that monitors the continuity of the optic paths in the fiber optic network and causes the optical route protection switch to switch the broadband optical signal from a first optic path to a second optic path if a discontinuity is detected in the first optic path.

24. The system of claim 1, wherein the ONT units receive an upstream baseline signal and convert the upstream baseline signal into an upstream baseline optical signal, wherein the upstream baseline optical signal is transmitted to the central office through the fiber optic network and is received by the baseline optical link.

25. The system of claim 24, wherein the baseline optical link is a baseline optical line termination (OLT) unit that includes a baseline optical filter that splits the upstream baseline optical signal and passes the downstream baseline optical signal.

26. The system of claim 24, wherein the upstream baseline optical signal is within a third optic bandwidth, and wherein the upstream baseline optical signal, the downstream baseline optical signal and the second downstream optical signal are transmitted through the fiber optic network on a single optic fiber.

27. The system of claim 24, wherein the upgraded ONT unit receives a second upstream signal and converts the second upstream signal into a second upstream optical signal, wherein the second upstream optical signal is transmitted to the central office through the fiber optic network and is received by the additional optical link.

28. The system of claim 1, wherein upgraded ONT includes a course wavelength division multiplexing (CWDM) ONT unit, and wherein the CWDM ONT unit generates an upstream T-Band optical signal that is transmitted to the central office through the fiber optic network and is received by the additional optical link.

29. The system of claim 28, wherein the upgraded ONT unit also includes a baseline ONT unit and a wavelength division multiplexer (WDM), wherein the baseline ONT unit generates an upstream baseline optical signal that is combined with the upstream T-Band optical signal by the WDM to generate a broadband upstream signal that is transmitted to the central office through the fiber optic network and is demultiplexed at the central office by an additional WDM.

30. The system of claim 1, wherein upgraded ONT includes a dense wavelength division multiplexing (DWDM) ONT unit, and wherein the DWDM ONT unit generates an upstream L-Band optical signal that is transmitted to the central office through the fiber optic network and is received by the additional optical link.

31. The system of claim 30, wherein the upgraded ONT unit also includes a baseline ONT unit and a wavelength division multiplexer (WDM), wherein the baseline ONT unit generates an upstream baseline optical signal that is combined with the upstream L-Band optical signal by the WDM to generate a broadband upstream signal that is transmitted to the central office through the fiber optic network and is demultiplexed at the central office by an additional WDM.

32. A method for upgrading a baseline passive optical network (PON), comprising the steps of:

provinding a baseline optical link in a central office that receives downstream baseline communication signals from one or more service provider and converts the downstream baseline communication signals into a downstream baseline optical signal;

installing an additional optical link in the central office that receives an additional type of communication signals from one or more service provider and converts the additional type of communication signals into an additional downstream optical signal;

multiplexing the downstream baseline optical signal and the additional downstream optical signal to generate a broadband optical signal;

transmitting the broadband optical signal over a fiber optic network;

providing a baseline optical network termination (ONT) unit at a location in the PON;

receiving the broadband optical signal from the fiber optic network with the baseline ONT unit and splitting the downstream baseline optical signal from the broadband optical signal;

installing an upgraded ONT unit at a location in the PON;

receiving the broadband optical signal from the fiber optic network with the upgraded ONT unit;

filtering at a first filter the broadband optical signal to isolate the additional downstream optical signal from the broadband optical signal;

forwarding a remaining portion of the broadband optical signal to a second filter;

filtering at the second filter the remaining potion of the broadband signal to isolate the downstream baseline optical signal from the remaining portion of the broadband optical signal after the second downstream optical signal has been extracted from the broadband optical signal;

passing an upstream signal through the first and second filters to the fiber optic network.

* * * * *